(12) United States Patent
Palanki et al.

(10) Patent No.: US 9,503,858 B2
(45) Date of Patent: Nov. 22, 2016

(54) SELECTIVE CROWDSOURCING OF LOCATION-RELATED DATA

(71) Applicant: QUALCOMM Incorporated, San Diego, CA (US)

(72) Inventors: Ravi Palanki, Cupertino, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 14/472,196

(22) Filed: Aug. 28, 2014

(65) Prior Publication Data

US 2016/0066151 A1 Mar. 3, 2016

(51) Int. Cl.
*H04W 64/00* (2009.01)
*H04W 4/02* (2009.01)
*G01S 5/02* (2010.01)
*H04L 29/08* (2006.01)

(52) U.S. Cl.
CPC ............ *H04W 4/025* (2013.01); *G01S 5/0252* (2013.01); *H04L 67/10* (2013.01)

(58) Field of Classification Search
CPC ...... G01S 5/0252; G01S 5/0236; G01S 5/02; G01S 5/0273; G01S 5/0278; G01S 5/0018; G01S 19/39; G06F 2221/2111; H04W 4/02; H04W 4/04; H04W 84/12; H04W 88/08; H04W 4/028; H04W 64/00
See application file for complete search history.

(56) References Cited

U.S. PATENT DOCUMENTS

| | | | |
|---|---|---|---|
| 8,639,266 B2 | 1/2014 | Zelinka et al. | |
| 8,688,396 B2 | 4/2014 | Lin et al. | |
| 9,338,592 B1* | 5/2016 | Mahapatra | H04W 4/02 |
| 2011/0163914 A1 | 7/2011 | Seymour | |
| 2013/0084891 A1* | 4/2013 | Khorashadi | H04W 4/025 455/456.3 |
| 2014/0036768 A1 | 2/2014 | Gao et al. | |
| 2014/0094190 A1 | 4/2014 | Dicke | |
| 2014/0179237 A1 | 6/2014 | Gao et al. | |

OTHER PUBLICATIONS

International Search Report and Written Opinion—PCT/US2015/042759—ISA/EPO—Nov. 23, 2015.

* cited by examiner

*Primary Examiner* — Quan M Hua
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for selective crowdsourcing of location-related data, such as within an indoor or like environment, for example, for use in or with a mobile communication device.

29 Claims, 5 Drawing Sheets

SELECTIVE CROWDSOURCING OF LOCATION-RELATED DATA

BACKGROUND

1. Field

The present disclosure relates generally to position or location estimations of mobile communication devices and, more particularly, to selective crowdsourcing of location-related data.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance data obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless communications network. Acquired wireless signals may, for example, be processed by or at a mobile communication device, and its location may be estimated using known techniques, such as Advanced Forward Link Trilateration (AFLT), base station identification, or the like.

In an indoor environment, certain mobile communication devices may be unable to reliably receive or acquire satellite or like wireless signals to facilitate or support one or more position estimation techniques. As such, in an indoor environment, different techniques may be employed to enable navigation or location services. For example, at times, an indoor location of a mobile communication device may be estimated via radio heatmap signature matching, in which current characteristics of wireless signals received at the mobile device are compared with expected or previously measured signal characteristics stored as heatmap values in a database. By finding a signature in a database that most closely matches characteristics exhibited by wireless signals received at a mobile device, a location associated with a matching signature may be used as an estimated location of a mobile device. In some instances, however, a data collection process, such as to facilitate or support subsequent radio heatmap signature matching, for example, may be prone to a considerable amount of data redundancy or asymmetry.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
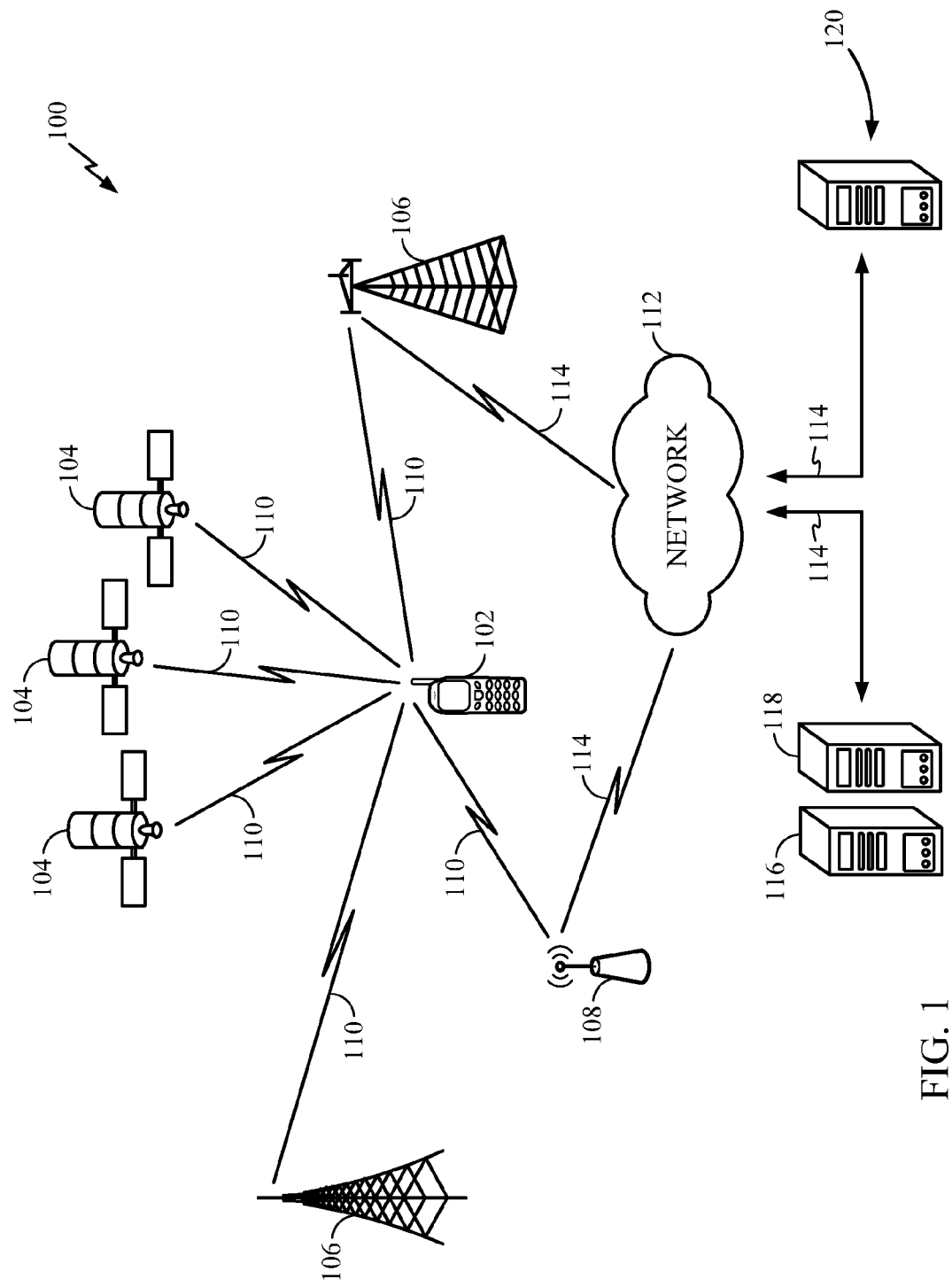
FIG. 1 is a schematic diagram illustrating features associated with an implementation of an example operating environment.

Example implementations relate to techniques for selective crowdsourcing of location-related data. In one implementation, a method may comprise collecting, at a mobile device, measurements of transmissions of one or more wireless transmitters while traveling within an area in a venue; inhibiting collection of the measurements in at least one portion of the venue indicated by a crowdsourcing server; and communicating one or more messages to the crowdsourcing server comprising the collected measurements for use in computing positioning assistance data based, at least in part, on the one or more wireless transmitters.

In another implementation, an apparatus may comprise a mobile device comprising a wireless transceiver to communicate with a crowdsourcing server via an electronic communications network; and one or more processors to collect measurements of transmissions of one or more wireless transmitters while traveling within an area in a venue; inhibit collection of the measurements in at least one portion of the venue indicated by the crowdsourcing server; and communicate one or more messages to the crowdsourcing server comprising the collected measurements for use in computing positioning assistance data based, at least in part, on the one or more wireless transmitters.

In yet another implementation, an apparatus may comprise means for collecting, at a mobile device, measurements of transmissions of one or more wireless transmitters while traveling within an area in a venue; means for inhibiting collection of the measurements in at least one portion of the venue indicated by a crowdsourcing server; and means for communicating one or more messages to the crowdsourcing server comprising the collected measurements for use in computing positioning assistance data based, at least in part, on the one or more wireless transmitters.

In yet another implementation, an article may comprise a non-transitory storage medium having instructions executable by a processor to collect, at a mobile device, measurements of transmissions of one or more wireless transmitters while traveling within an area in a venue; inhibit collection of the measurements in at least one portion of the venue indicated by a crowdsourcing server; and communicate one or more messages to the crowdsourcing server comprising the collected measurements for use in computing positioning assistance data based, at least in part, on the one or more wireless transmitters. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for selective crowdsourcing of location-related data. As will be seen, in some instances, location-related data may include, for example, measurements of transmissions of one or more wireless transmitters indicative of timing or signaling characteristics of detected or observed wireless signals, such as received signal strength-related measurement (e.g., RSSI, etc.), round-trip delay times-related measurement (e.g., RTT, etc.), or the like. As also discussed below, location-related data may, for example, be computed for a particular indoor or like environment and may be provided as part of positioning assistance data so as to assist in localization of a mobile communication device. As used herein, "mobile device," "mobile communication device," "crowdsourcing device," "location-aware mobile device," or like terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heatmap generation tools, or the like. It should be appreciated, however, that these are merely examples of mobile devices that may be used, at least in part, to implement one or more operations or techniques for selective crowdsourcing of location-related data, and that claimed subject matter is not limited in this regard. It should also be noted that the terms "position" and "location" may be used interchangeably herein.

At times, location-related data may be collected or gathered, such as in connection with a suitable server (e.g., a crowdsourcing server, etc.), for example, using one or more crowdsourcing techniques. In this context, "crowdsource," "crowdsourcing" or like terms may refer to a process of measuring, collecting, generating, communicating, etc. signal-related measurements or like data by one or more agents, clients, or users, such as via co-located mobile devices, for example, while traveling within an area of interest, indoor or otherwise. The terms "agent," "user," or "client" may be used interchangeably herein and may refer to a person, device, or application that may facilitate or support one or more crowdsourcing techniques. For example, at times, agents, clients, or users may comprise volunteers or like non-experts, rather than professionals with a higher level of skill or designated equipment. As will be seen, in some instances, crowdsourcing may, for example, be used, at least in part, to construct or update a radio heatmap, database of radio beacons (e.g., IEEE 802.11 std. Wi-Fi access points, etc.), etc. for an area of interest. As also discussed below, in at least one implementation, an area of interest may be associated with an indoor or like environment, such as a venue, for example.

As used herein, "venue" may refer to a physical place or locale that may be associated with the whereabouts of an object or thing (e.g., a user, mobile device, etc.), such as according to a suitable point of reference. A point of reference may, for example, be represented via geographic coordinates (e.g., latitude, longitude, etc.), a street address, governmental jurisdiction, postal zip code, name, number, or the like. Optionally or alternatively, a venue may also include references to altitude, time, direction, distance (e.g., from another point of reference, etc.), or the like. In some instances, a venue may comprise, for example, a partially or substantially enclosed area, such as associated with an indoor or like environment (e.g., a building, area within a building, urban canyon, etc.), outdoor environment, or any combination thereof. By way of example but not limitation, a venue may include, for example, an office building, a convention center, an auditorium, an amphitheater, a warehouse, a classroom building, a theater, a supermarket, a shopping mall, a sports arena, a stadium, a transit station terminal, a library, a garage, or the like. Of course, these are merely examples related to a venue, and claimed subject matter is not so limited.

As alluded to previously, in an indoor environment or like partially or substantially enclosed area (e.g., an urban canyon, etc.), certain mobile devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, blocked, etc.), which may at least partially preclude their use for position estimations. As such, in an indoor or like environment, such as in a venue of interest, for example, different techniques may be employed to enable navigation or location services. For example, a mobile device may obtain an indoor position fix by measuring ranges to three or more terrestrial wireless access points positioned at known locations within a venue, just to illustrate one possible implementation. Ranges may be measured, for example, by obtaining a Media Access Control identifier (MAC ID) address from wireless signals received from wireless transmitters (e.g., access points, etc.) and measuring one or more characteristics of received signals, such as signal strength, round trip delay, or the like.

As was also indicated, at times, an indoor location of a mobile device may be estimated via radio heatmap signature matching, for example, in which current or live characteristics or signatures of wireless signals received at the mobile device are compared with expected or previously measured signal characteristics stored as radio heatmap values in a database. Typically, such as during an off-line stage, a particular indoor or like area (e.g., in a venue, etc.) may be surveyed, for example, and radio heatmap values, such as in the form of observed characteristics of wireless signals or so-called signal "signatures" indicative of received signal strength (e.g., RSSI, etc.), round-trip delay times (e.g., RTT, etc.), or the like may be collected. During an on-line stage, a mobile device may, for example, communicate currently observed or live signal signatures to a suitable server for matching with previously measured signal characteristics. By finding a signal signature in a database that more closely matches characteristics exhibited by signals currently observed at a mobile device, a location associated with a matching signature may, for example, be used as an estimated location of the mobile device.

In some instances, a radio heatmap, such as constructed via crowdsourced measurements for a particular indoor or like area, for example, may be selectively provided or otherwise made available to a mobile device by an indoor navigation system, location server, etc. as part of positioning assistance data. A radio heatmap may, for example, be provided in the form of heatmap values or like metadata representing observed characteristics of wireless signals (e.g., RSSI, RTT, etc.) at particular locations in an area. A radio heatmap may be defined by a grid of points laid over or mapped to a floor plan or layout of an indoor or like area at relatively uniform spacing (e.g., two-meter separation of neighboring grid points, etc.), for example, and representing expected signal signatures at these points. Thus, for a known wireless transmitter, a radio heatmap may, for example, associate a particular grid point with a heatmap value representative of an expected signal signature at the grid point. As such, heatmap values associated with one or more known wireless transmitters (e.g., Wi-Fi access points, etc.) may, for example, enable a mobile device to correlate or associate observed signal signatures with locations within an indoor or like area of interest.

At times, instead of or in addition to a radio heatmap, an indoor navigation system, location server, etc. may selectively provide or otherwise make available (e.g., to a mobile device, etc.) other suitable positioning assistance data, which may include, for example, an electronic digital map for a venue of interest. An electronic digital map may, for example, be provided by a suitable server at or upon entering a particular indoor or like area (e.g., a shopping mall, etc.), upon request, user input, or the like. An electronic digital map may include, for example, a floor plan or layout comprising indoor features of a venue or an area within a venue, such as doors, hallways, staircases, elevators, walls, etc., as well as points of interest (POIs), such as restrooms, stores, rooms, entry ways, pay phones, or the like. In some instances, an electronic digital map may, for example, be stored at a suitable server to be accessible or useable by a mobile device, such as via a selection or activation of a Uniform Resource Locator (URL), for example. By having a digital map of a venue or area of interest, a mobile device may, for example, be capable of overlaying its current location over the displayed map of the venue or area so as to provide an associated user with additional context, frame of reference, or the like.

At times, to facilitate or support positioning in a venue of interest, such as via radio heatmap signature matching, for example, it may be useful to develop a relatively comprehensive or otherwise sufficient database of associated wireless transmitters, radio beacons (e.g., Wi-Fi access points, etc.), or the like. An extensive site survey (e.g., dedicated location fingerprinting, ray tracing, etc.) may present a number of challenges, such as, for example, simulation or computation costs, time or effort involved, or the like. Thus, as was indicated, in some instances, such as to reduce associated costs, for example, one or more crowdsourcing techniques may be employed, at least in part. For example, a crowdsourcing mobile device co-located with a user traveling within a particular area in a venue may periodically communicate (e.g., at intermittent intervals, etc.) one or more messages to a crowdsourcing server. A message may include, for example, a "report" of signal-related RSSI, RTT, or like measurements (e.g., previously collected, currently observed, etc.) characterizing or defining an associated wireless environment. Thus, the terms "report" and "measurement report" may be used interchangeably herein. At times, a report may be "geo-tagged," such as correlated or associated with a current or last position fix obtained via an SPS, for example, if applicable or available. It should be noted that, in some instances, a measurement report may not be "geo-tagged."

As was indicated, at times, location-aware mobile devices may have a capability to approximate so-called "ground truth" locations in an indoor or like area where a signal-related measurement may be made in connection with one or more proximate wireless transmitters. Here, any suitable techniques, such as, for example, obtaining a contemporaneous SPS position fix, applying trilateration to measurements of ranges to transmitters at fixed locations, receiving a user input at a user interface, applying dead-reckoning measurements from inertial or motion sensors (e.g., from a known starting position), etc. may be used, in whole or in part. In some instances, reported measurements may, for example, be paired or correlated with "ground truth" locations within a venue of interest. In this context, a "ground truth" location may generally refer to a mapped location that may correlate or correspond to a location of a physically collected or observed signal-related measurement, such as a "ground truth" measurement, for example. The term "ground truth" measurement may generally refer to a signal-related measurement physically collected or observed at a particular location, for example, rather than via remote sensing. As a way of illustration, a grid of points laid over or mapped to a floor plan of a venue at which signal-related measurements are physically collected or observed may comprise "ground truth" locations. Claimed subject matter is not limited to a particular "ground truth" measurement or location, of course.

Continuing with the above example, at times, a crowdsourcing server may, for example, aggregate communicated reports and may process associated signal-related measurements in a suitable manner. For example, in some instances, based, at least in part, on reported measurements, a server may compute expected RSSI, RTT, or like values to be associated with discrete locations in a radio heatmap (e.g., via a grid of points, etc.) for a particular venue. At times, a server may also obtain fixed locations of wireless transmitters, and may provide associated RSSI, RTT, or like values, transmitter locations, etc. to one or more mobile devices as part of positioning assistance data. A mobile device may subsequently obtain its current position fix within a venue of interest via any one of appropriate techniques, such as trilateration, for example. It should be appreciated that, depending on an implementation, computing positioning assistance data, estimating locations of wireless transmitters, or like processing may be performed, at least in part, on a mobile device, suitable server, or any combination thereof.

As alluded to previously, in some instances, however, a process of crowdsourcing location-related data, such as collecting, communicating, etc. RSSI, RTT, or like measurements may suffer or be prone to a considerable amount of data redundancy or asymmetry, which may depend, at least in part, on locations where reported measurements are obtained. For example, certain areas within a venue, such as locations more frequently visited by crowdsourcing users may have a much higher density or volume of communicated reports and, thus, more measurement redundancy than some other areas within the venue. These more frequently visited areas may include, for example, main entry ways, hallways, food courts, or like locations with typical or normal pedestrian traffic. At times, this may leave a larger number of less frequently visited areas within a venue, such as back or side entrances, distant hallways or wings, or like locations where measurements may be desired, for example, without sufficient or suitable coverage, thus, creating data asymmetry. In some instances, a higher density or volume of reports from smaller but more frequently visited areas may also "overwhelm" or swamp out reports from larger but less frequently visited areas within a venue. For example, if a crowdsourcing server has limited or less than sufficient memory resources or processing capability (e.g., finite amount of storage, buffers, etc.), at times, it may store mostly redundant location-related data reported from more frequently visited locations, such as at the expense of other locations within a venue.

In addition, in some instances, this or like data asymmetry or redundancy may, for example, affect accuracy of localization-related algorithms or computing approaches that may be employed to facilitate or support positioning of mobile devices within a venue. For example, at times, a so-called "sample mean" algorithm utilizing arithmetic average or mean of locations of mobile devices reporting RSSI, RTT, etc. measurements of fixed wireless transmitters, if employed, may be less than robust or precise. To illustrate, if wireless transmitter measurements are mostly reported from mobile devices in a relatively smaller area, such as without accounting for other (e.g., larger, etc.) areas within a venue, for example, a particular fixed transmitter location may be estimated as a center of that small area, thus, contributing to data asymmetry. In some instances, this may also negatively affect correlation or pairing of collected measurements with "ground truth" locations, for example, which in turn may decrease utility or effectiveness of an associated radio heatmap, localization accuracy of mobile devices, or the like.

In some instances, discarding redundant location-related data, such as at or by a crowdsourcing server, for example, may at least partially address or alleviate these or like issues, but may be time-consuming, labor-intensive, waste available resources, or the like. For example, collecting, reporting, etc. measurements that would be mostly discarded (e.g., redundant, etc.) may needlessly increase power consumption of crowdsourcing mobile devices with limited power resources (e.g., battery-operated, etc.), thus, negatively affecting operating lifetime or overall utility of such devices. In addition, at times, a higher volume or density of redundant reports may tax available bandwidth in wireless communication links within a venue, memory of a mobile device, or the like. Accordingly, it may be desirable to develop one or more methods, systems, or apparatuses that may implement more robust indoor positioning, such as in an environment prone to data asymmetry or redundancy, for example, while reducing or improving power consumption of crowdsourcing mobile devices or other resources within a venue.

Thus, as will be described in greater detail below, in an implementation, one or more suitable areas within a venue, such as areas where measurement reports may or may not be desired, for example, may be published or made available, such as by a crowdsourcing server. Suitable areas may, for example, be published or made available (e.g., communicated, etc.) using any appropriate web-related service, such as utilizing whitelists, blacklists, or the like, in whole or in part. In this context, "whitelist" may refer to a suitable designation of one or more areas (e.g., a list, data structure, etc.), such as within a venue, for example, where measurement reports may be desired (e.g., "send a report if in this area," etc.), and "blacklist" may refer to a designation of one or more areas where measurement reports may not be desired (e.g., "do not send a report if in this areas," etc.). As such, based, at least in part, on a published "whitelist," "blacklist," etc., a crowdsourcing mobile device may, for example, collect, communicate, etc. RSSI, RTT, or like measurements while in a desired or "whitelisted" area or may inhibit or postpone such a collection, communication, etc. while within a non-desired or "blacklisted" area. It should be noted that a "whitelist," "blacklist," etc. may include any suitable information or data, such as, for example, one or more Internet Protocol (IP) addresses, e-mail addresses, transmission rates, SPS coordinates, MAC addresses, etc. that may facilitate or support one or more operations or processes discussed herein. Thus, as was indicated, at times, selective crowdsourcing of location-related data may, for example, help to more effectively or efficiently construct or update a database of wireless transmitters, radio beacons, etc. for a venue of interest (e.g., a radio heatmap, etc.) and may offer or provide a better crowdsourcing user experience. As discussed below, selective crowdsourcing of location-related data may, for example, be implemented in connection with various types of mobile devices, transmission rates, detectable wireless transmitters, geofences, etc., depending on an implementation.

FIG. 1 is a schematic diagram illustrating features associated with an implementation of an example operating environment 100 capable of facilitating or supporting one or more processes or operations for selective crowdsourcing of location-related data. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, operating environment 100 may comprise, for example, one or more satellites 104, base transceiver stations 106, wireless transmitters 108, etc. capable of communicating with mobile device 102 via communication links 110 in accordance with one or more communication protocols. Satellites 104 may be associated with one or more satellite positioning systems (SPS), such as, for example, the United States Global Positioning System (GPS), the Russian GLONASS system, the European Galileo system, as well as any system that may utilize satellites from a combination of satellite systems, or any satellite system developed in the future. For example, satellites 104 may be from any one of several regional navigation satellite systems (RNSS') such as the Wide Area Augmentation System (WAAS), European Geostationary Navigation Overlay Service (EGNOS), Quasi-Zenith Satellite System (QZSS), etc. Base transceiver stations 106, wireless transmitters 108, etc. may be of the same or similar type, for example, or may represent different types of devices, such as access points, radio beacons, cellular base stations, femtocells, or the like, depending on an implementation.

Although not shown, in some instances, operating environment 100 may include, for example, a larger number of wireless transmitters 108 that may be associated with an indoor or like area of interest, such as a venue. A larger number of wireless transmitters 108 may correspond to or correlate with a more comprehensive indoor or like positioning approach, such as a radio heatmap, for example. It should be noted that one or more wireless transmitters 108 may be capable of transmitting as well as receiving wireless signals. In a particular implementation, one or more wireless transmitters 108 may be capable of communicating with mobile device 102 at a shorter range than at a range enabled by base transceiver station 106. For example, one or more wireless transmitters 108 may be positioned in an indoor or like environment, such as a venue, as was indicated. One or more wireless transmitters 108 may, for example, provide access to a wireless local area network (WLAN, e.g., IEEE std. 802.11 network, etc.) or wireless personal area network (WPAN, e.g., Bluetooth® network, etc.). In another example implementation, one or more wireless transmitters 108 may comprise, for example, a femtocell transceiver capable of facilitating or supporting communication within operating environment 100 according to a cellular communication protocol.

In some instances, one or more base transceiver stations 106, wireless transmitters 108, etc. may, for example, be operatively coupled to an electronic communications network 112 that may comprise one or more wired or wireless communications or computing networks capable of providing suitable information, such as via one or more communication links 114, 110, etc. As will be seen, provided information may include, for example, positioning assistance data, such as a radio heatmap, recent position fix obtained via an SPS, "whitelist," "blacklist," one or more messages with signal-related measurements, or the like. At times, provided information may include, for example, locations of one or more wireless transmitters 108, an electronic digital map, geofence-related parameters (e.g., a location, boundary, etc. of a geofence), or any other suitable data, location-related or otherwise, capable of facilitating or supporting one or more operations or processes associated with operating environment 100. Positioning assistance data may, for example, be provided in the form of a suitable data structure, such as an audio, video, or sound file, look-up table, mathematical formula, algorithm, metadata, etc., which may depend, at least in part, on an application, network, environment, radio heatmap, mobile device, service provider, or the like.

In an implementation, network 112 may be capable of facilitating or supporting communications between suitable computing platforms or devices, such as, for example, mobile device 102, one or more base transceiver stations 106, wireless transmitters 108, as well as one or more crowdsourcing servers associated with operating environment 100. In some instances, crowdsourcing servers may include, for example, a location server 116, positioning assistance server 118, as well as one or more other servers, indicated generally at 120 (e.g., navigation, information, map, etc. server, etc.), capable of facilitating or supporting one or more operations or processes associated with operating environment 100. In a particular implementation, network 112 may comprise, for example, Internet Protocol (IP) infrastructure capable of facilitating a communication between mobile device 102 and crowdsourcing servers 116, 118, or 120 via wireless transmitter 108, base transceiver station 106 (e.g., via a network interface, etc.), or the like. In another implementation, network 112 may comprise cellular communication network infrastructure, such as, for example, a base station controller or master switching center (not shown) to facilitate mobile cellular communication with mobile device 102.

Location server 116 may provide an estimate of a coarse location of mobile device 102 within a venue of interest associated with operating environment 100, such as at or upon entry of the venue, for example. A coarse location may, for example, be determined based, at least in part, on a last or recent position fix obtained via an SPS, input provided by an associated user, built-in or remote sensors, or the like. For example, at times, a coarse location of mobile device 102 may be determined using a proximity to one or more reference points, such as by knowing which wireless transmitter 108, etc. mobile device 102 is using at a given time. In some instances, mobile device 102 may utilize its coarse location, in whole or in part, in subsequent messages with a suitable server, such as crowdsourcing servers 116, 118, or 120, for example, to obtain an electronic digital map or other information relevant to an area in a venue identified by a coarse location (e.g., a routing graph, etc.). Optionally or alternatively, a coarse location of mobile device 102 may, for example, be determined, at least in part, on mobile device 102 using one or more applicable techniques (e.g., dead reckoning, etc.). In some instances, such as in addition to or instead of determining a coarse location via one or more applicable approaches, for example, mobile device 102 may communicate MAC addresses of one or more known (e.g., visible, etc.) wireless transmitters 108, etc. to a suitable server, and may be provided an electronic digital map of an associated area. Mobile device 102 may, for example, estimate its location based, at least in part, on provided map and known wireless transmitters 108, etc. using one or more appropriate techniques.

Positioning assistance server 118 may, for example, provide positioning assistance data, such as locations of one or more wireless transmitters 108, a radio heatmap, signal signatures associated with "ground truth" location estimations, or the like. For example, positioning assistance server 118 may provide locations of one or more wireless transmitters 108 via a suitable reference frame, such as (X, Y, Z) coordinates in three-dimensional Cartesian coordinate space that may be mapped according to a global coordinate system, local coordinate system (e.g., a venue, etc.), etc., just to illustrate a few possible implementations. As will be seen, mapped locations of one or more wireless transmitters 108 may, for example, be used, at least in part, in connection with an indication of received signal strength to determine whether to communicate a measurement report to a crowdsourcing server. Of course, claimed subject matter is not limited to a particular reference frame or positioning assistance data.

In some instances, server 120 may comprise a map server, for example, that may provide an electronic digital map as well as other positioning assistance data or like information for a particular indoor or like area of interest, such as a venue. An electronic digital map may comprise, for example, a floor plan or layout of a venue or a portion thereof. By way of non-limiting example, an electronic digital map may include one or more computer-aided design (CAD) type files identifying structural features of a venue, such as walls, rooms, doors, passageways, elevators, staircases, ladders, floors, ceilings, or the like. At times, an electronic digital map may comprise, for example, locations of one or more wireless transmitters 108, etc. relative to one or more areas within a venue, structural features (e.g., walls, doors, windows, etc.), or the like. Thus, in some instances, such as at or upon entry of a venue of interest, upon user input, etc., mobile device 102 may communicate a request to server 120 (e.g., a map server, etc.) to provide an electronic digital map covering the venue, a portion thereof, or adjacent areas, if applicable. A request may reference or otherwise include, for example, a coarse location of mobile device 102, as was indicated, such that server 120 (e.g., a map server, etc.) may associate the coarse location of mobile device 102 with a particular area in a venue, and then communicate a relevant map to mobile device 102. As was indicated, an electronic digital map may, for example, be used, at least in part, to provide additional context to a crowdsourcing user collecting, communicating, etc. signal-related measurements, such as while traveling within an area in a venue.

According to an embodiment, mobile device 102 may access or obtain suitable positioning assistance data via communications with crowdsourcing servers 116, 118, or 120 by, for example, requesting the data through selection of a universal resource locator (URL), as previously mentioned. The terms "positioning assistance data" and "indoor navigation assistance data" may be used interchangeably herein and may include any suitable information to facilitate or support one or more techniques or processes discussed herein. In particular implementations, crowdsourcing servers 116, 118, or 120 may be capable of providing indoor navigation assistance data to cover many different indoor areas in a venue including, for example, floors of buildings, wings of hospitals, terminals at an airport, portions of a university campus, areas of a large shopping mall, just to name a few examples. At times, memory resources at mobile device 102 and data transmission resources may make receipt of indoor navigation assistance data for all areas served by crowdsourcing servers 116, 118, or 120 impractical or infeasible; thus, a request for indoor navigation assistance data from mobile device 102 may indicate a course estimate of a location of mobile device 102, as was indicated. Mobile device 102 may then be provided indoor navigation assistance data covering areas proximate to a course estimate of a location of mobile device 102. Optionally or alternatively, MAC addresses of one or more known (e.g., visible, etc.) wireless transmitters 108, etc. may, for example, be communicated by mobile device 102 to a suitable server, such as for current location determination, as was also discussed.

In particular implementations and as discussed herein, mobile device 102 may have circuitry and processing resources capable of measuring, collecting, storing, or communicating suitable signal-related characteristics (e.g., RSSI, RTT, etc.), estimating fixed transmitter locations, computing a position fix, or the like. For example, mobile device 102 may compute a position fix based, at least in part, on pseudorange measurements to four or more SPS satellites 104. Here, mobile device 102 may compute such pseudorange measurements based, at least in part, on pseudonoise code phase detections in signals 110 acquired from four or more SPS satellites 104, for example. In particular implementations, mobile device 102 may receive from crowdsourcing servers 116, 118, or 120 positioning assistance data to aid in the acquisition of signals transmitted by SPS satellites 104 including, for example, almanac, ephemeris data, Doppler search windows, just to name a few examples.

In other implementations, mobile device 102 may, for example, obtain a position fix by processing signals received from one or more terrestrial wireless transmitters positioned at known fixed locations (e.g., wireless transmitter 108, base transceiver station 106, etc.) using any one of several techniques such as, for example, advanced forward trilateration (AFLT), observed time difference of arrival (OT-DOA), or the like. In these particular techniques, a range from mobile device 102 may be measured to three or more of such transmitters based, at least in part, on pilot signals transmitted by the transmitters and received at mobile device 102. In some instances, locations or identities (e.g., a MAC address, etc.) of one or more base transceiver stations 106, wireless transmitters 108, etc. in a particular area associated with operating environment 100 may be provided by crowdsourcing servers 116, 118, or 120 in the form of a base station almanac (BSA).

As was indicated, in some instances, mobile device 102 may be capable of computing a position fix based, at least in part, on signals acquired from one or more terrestrial wireless transmitters 108 (e.g., WLAN access points positioned at known locations, etc.). For example, mobile device 102 may obtain a position fix by measuring ranges to three or more suitable indoor terrestrial wireless access points positioned at known locations. Ranges may be measured, for example, by obtaining a MAC ID address from signals received from access points and obtaining range measurements to these access points by measuring one or more received signal characteristics (e.g., RSSI, RTT, etc.). In at least one implementation, mobile device 102 may obtain a position fix by measuring or applying characteristics of acquired signals to a radio heatmap indicating expected RSSI, RTT, or like signatures at particular locations in a venue. In particular implementations, a radio heatmap may associate identities of one or more wireless transmitters 108 (e.g., a MAC address, which is discernible from a signal acquired from a local transmitter, etc.), expected RSSI from signals transmitted by the identified local transmitters, an expected RTT from the identified transmitters, means or standard deviations from these expected RSSI, RTT, etc. It should be understood, however, that these are merely examples of a radio heatmap, and that claimed subject matter is not limited in this respect.

Even though a certain number of computing platforms or devices are illustrated herein, any number of suitable computing platforms or devices may be implemented to facilitate or otherwise support one or more techniques or processes associated with operating environment 100. For example, at times, network 112 may be coupled to one or more wired or wireless communications networks (e.g., Wi-Fi, etc.) so as to enhance a coverage area for communications with mobile device 102, one or more base transceiver stations 106, wireless transmitters 108, crowdsourcing servers 116, 118, 120, or the like. In some instances, network 112 may facilitate or support femtocell-based operative regions of coverage, for example. Again, these are merely example implementations, and claimed subject matter is not limited in this regard.

Figure 2:
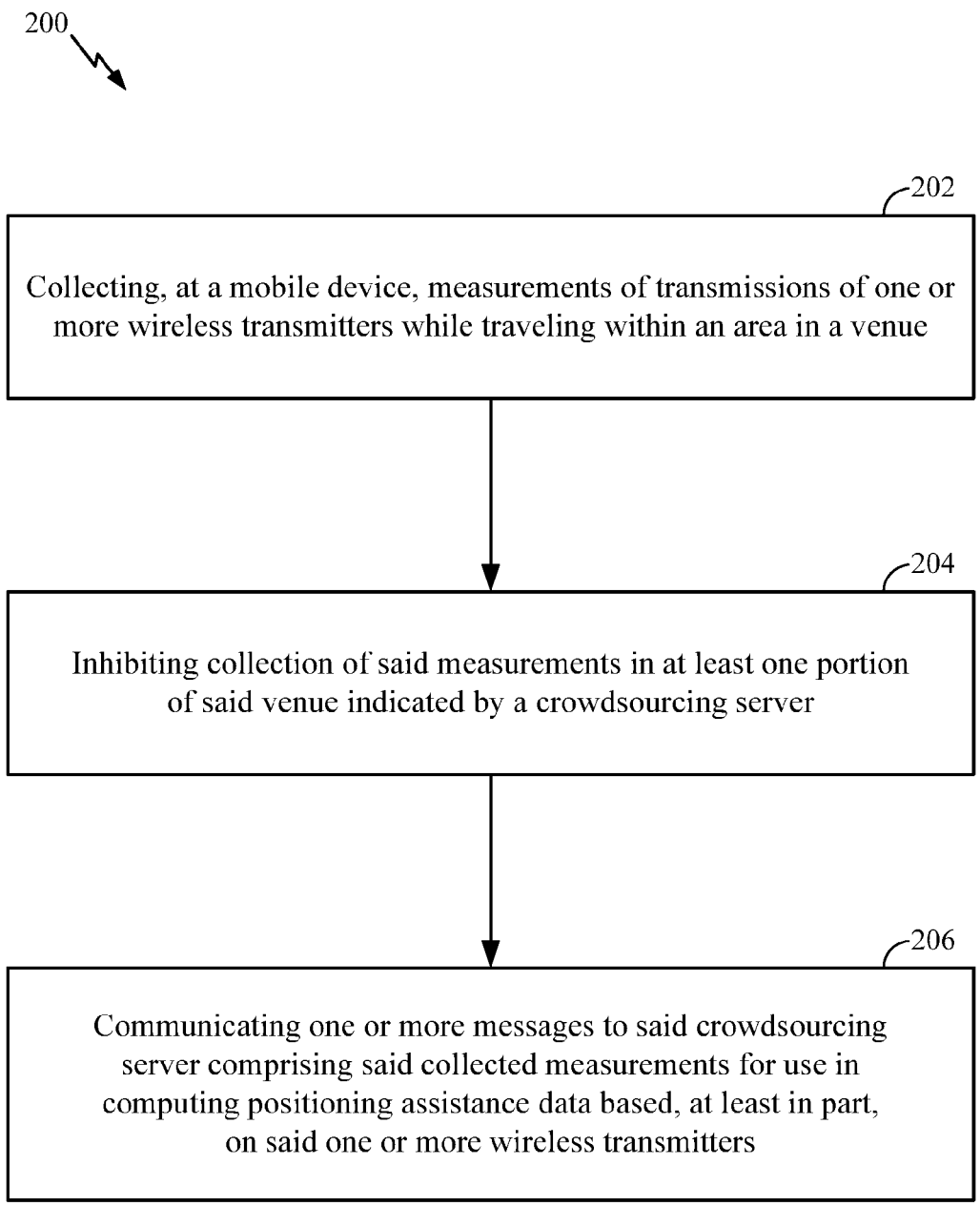
FIG. 2 is a flow diagram illustrating an implementation of an example process that may be performed to facilitate or support techniques for selective crowdsourcing of location-related data.

With this in mind, attention is now drawn to FIG. 2, which is a flow diagram illustrating an implementation of an example process 200 that may be performed, in whole or in part, to facilitate or support one or more operations or techniques for selective crowdsourcing of location-related data. As was indicated, at times, process 200 may be implemented, at least in part, by one or more users employing a co-located location-aware mobile device, such as mobile device 102 of FIG. 1, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with collecting, at a mobile device, measurements of transmissions of one or more wireless transmitters, such as by a crowdsourcing user, for example, while traveling within an area in a venue. As was indicated, measurements of transmissions may, for example, be collected with respect to RSSI, RTT, or like characteristics of wireless signals that, at times, may be paired or correlated with one or more estimated "ground truth" locations within a venue of interest, recent or last SPS position fix (e.g., geo-tagged, etc.), or the like. In some instances, measurements may, for example, be collected, stored, communicated, etc. via a suitable host crowdsourcing application, which may be provided to a user's mobile device by a suitable server, stored locally on a mobile device, etc. A crowdsourcing application may, for example, be activated, launched, downloaded, etc. upon user's entering a venue or portion thereof (e.g., an area, etc.), upon request, user input, or the like. Again, crowdsourcing or related applications are generally known and need not be described here in greater detail.

With regard to operation 204, collection of the measurements may, for example, be inhibited or postponed in at least one portion of the venue, such as indicated by a crowdsourcing server. As discussed above, at times, such an indication may, for example, be in the form of a "whitelist," "blacklist," etc. published by a crowdsourcing server with respect to a venue of interest or any portion thereof. For example, as illustrated via a schematic diagram of a venue 300 of FIG. 3, a suitable crowdsourcing server associated with venue 300 may publish a number of "whitelists," indicated generally at 302, 304, and 306, designating or indicating one or more areas where measurements of transmissions of one or more wireless transmitters, such as Wi-Fi access points 308, 310, 312, 314, or 316, for example, may be desired. As also illustrated, at times, a crowdsourcing server may also indicate or designate one or more areas where measurements of transmissions of one or more wireless transmitters, such as Wi-Fi access points 318, 320, or 322, for example, may not be desired, such as using "blacklists" 324 or 326, for example. Thus, here, a mobile device co-located with a crowdsourcing user may, for example, inhibit or postpone collecting measurements in one or more portions of venue 300, such as "blacklisted" areas 324 or 326, just to illustrate one possible implementation.

As was indicated, in some instances, measurement collection may not be inhibited or postponed, such as while a user is traveling within one or more "whitelisted" areas, such as areas 302, 304, or 306, for example, in venue 300. Thus, a user of a co-located mobile device may continue collecting measurements of transmissions of one or more wireless transmitters (e.g., Wi-Fi access points 308, 310, 312, 314, or 316, etc.), such as indicated by a crowdsourcing server. As also discussed above, "whitelisted" areas 302, 304, or 306 may comprise, for example, less frequently visited locations within venue 300, such as back or side entrances 328, distant hallways or wings 330, or the like. Claimed subject matter is not limited to particular areas, "whitelists," "blacklists," wireless transmitters, etc., of course. For example, at times, "blacklisted" areas may comprise any areas other than "whitelisted" areas within venue 300, just to illustrate another possible implementation.

In an implementation, a "whitelisted," "blacklisted", etc. area may, for example, be indicated via a suitable geofence bounding such an area so as to detect entries into or exits from the area in conjunction with one or more GPS or like GNSS position fixes obtained via a suitable positioning technique. A geofence may comprise, for example, a virtual perimeter on a geographic area established in connection with a suitable location-based service (LBS), such that if a user of a co-located mobile device enters or exits the perimeter (e.g., breaches a geofence, etc.), collection of signal-related measurements is initiated, performed, or inhibited. Geofences are generally known and need not be described here in greater detail. At times, detection of a geofence breach may, for example, be used, at least in part, to inform or notify a user (e.g., via a text message, e-mail, etc.) of a co-located mobile device that the user is within or outside of a "whitelisted," "blacklisted," etc. area. In this particular example, to inhibit collection of measurements within venue 300, such as with respect to Wi-Fi access points 320, 332, or 334, for example, a crowdsourcing server may employ one or more geofences, indicated generally at 336, such as to designate one or more "blacklisted" areas. As illustrated, geofences 336 may, for example, bound frequently visited areas, such as main entrances 338, an area of a food court 340, or like locations with a typical or normal pedestrian traffic, as discussed above. Again, claimed subject matter is not limited to particular geofences or areas shown.

Figure 3:
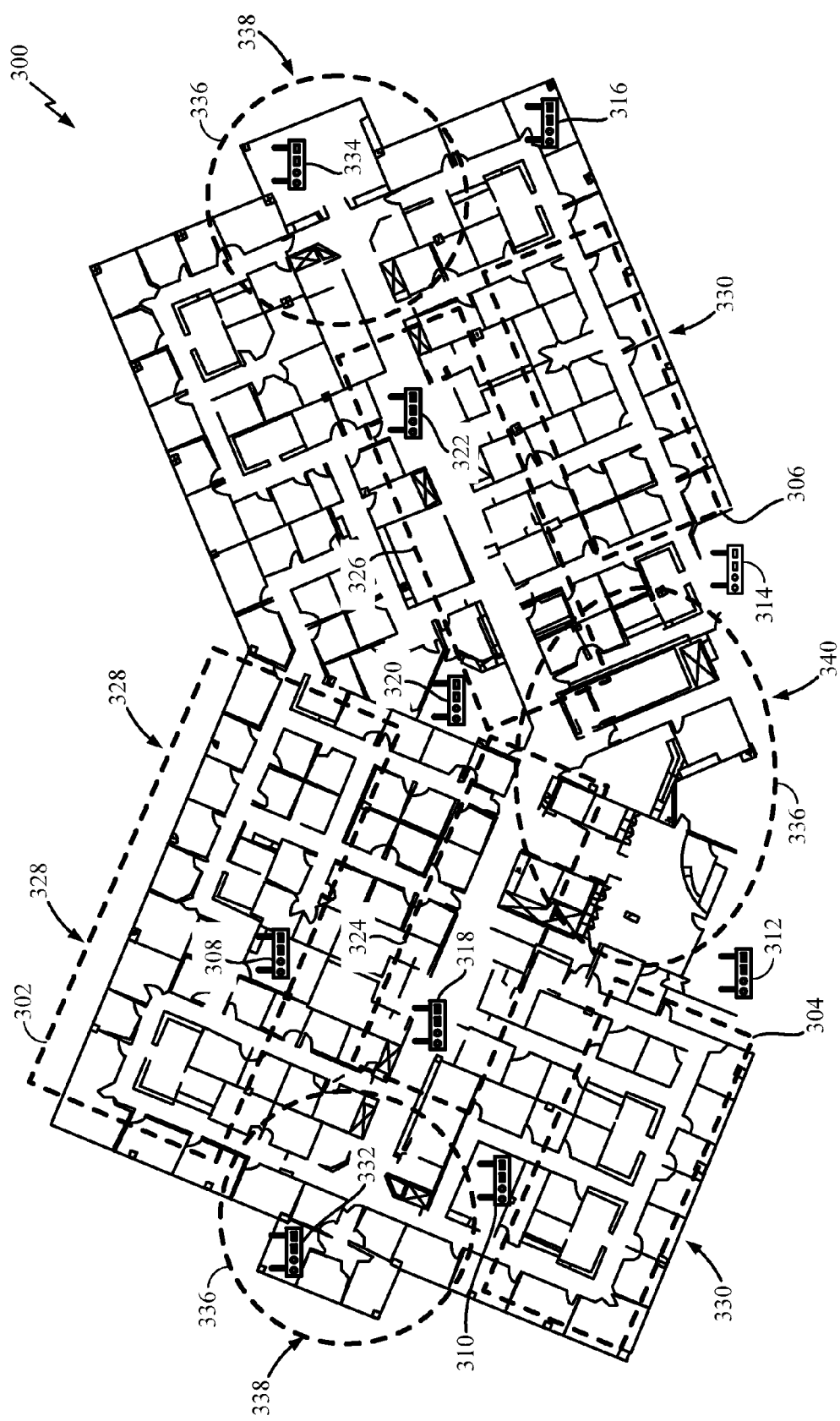
FIG. 3 is a schematic diagram illustrating an example implementation of a venue.

Referring back to process 200 of FIG. 2, at operation 206, one or more collected messages may, for example, be communicated to the crowdsourcing server based, at least in part, on the one or more wireless transmitters. As previously discussed, collected messages may comprise, for example, any suitable location-related data, such as measurements of RSSI, RTT, etc. observed or detected from one or more nearby wireless transmitters and may be used, at least in part, for computing positioning assistance data for a venue or interest. As was also indicated, in some instances, such as for geo-tagged reports, for example, a "whitelist," "blacklist," etc. may be based, at least in part, on one or more SPS position fixes (e.g., geo-coordinates, etc.). At times, however, SPS or like geo-tagging may not be available (e.g., no detectable SPS or like signals, etc.) or otherwise useful. In such a case, a "whitelist," "blacklist," etc. may be based, at least in part, on one or more wireless transmitters themselves. As illustrated in FIG. 3, a mobile device within venue 300 may communicate one or more messages to a crowdsourcing server if, for example, the strongest detected or currently observed signal is from Wi-Fi access point 314 with XYZ coordinates, and the second strongest signal if from Wi-Fi access point 316 with ABC coordinates. At times, a mobile device may refrain from communicating messages if, for example, it detects that the strongest signal is coming from some other Wi-Fi access point positioned at a known location within venue 300 (e.g., access point 310, 320, 322, etc.). Claimed subject matter is not so limited, of course. Any suitable wireless transmitters or combination of transmitters, coordinates, etc. may be used, in whole or in part.

In an implementation, instead of or in addition to performing a binary-type decision or approach, such as to communicate (e.g., while in "whitelisted" areas, etc.) or not to communicate (e.g., while in "blacklisted" areas, etc.) measurements, a mobile device may, for example, be capable of adjusting or varying in some manner its transmission rate. In this context, "transmission rate" may refer to the amount of data, location-related or otherwise, transmitted or communicated from one point to another at a given time. A mobile device may, for example, communicate crowdsourced measurements with a higher transmission rate in "whitelisted" areas, and with a lower transmission rate outside of "whitelisted" areas, just to illustrate one possible implementation. In some instances, a decision to increase or reduce a transmission rate may, for example, be based, at least in part, on the quality or accuracy of estimates of locations of associated wireless transmitters. For example, a higher transmission rate may be implemented if a mobile device is provided with an accurate or suitable location estimate of a proximate wireless transmitter, such as while traveling within a "whitelisted" area. A lower transmission rate may, for example, be implemented if a mobile device is outside of a "whitelisted" area, inside of a "blacklisted" area, geofence, or the like. Of course, these are merely details relating to adjusting or varying transmission rates, and claimed subject matter is not so limited. Thus, in addition to one or more techniques discussed above, adjusting or varying a transmission rate may also help a crowdsourcing mobile device to conserve battery power, processing resources, etc., such as while traveling within venue 300.

In at least one implementation, a decision to communicate or not to communicate measurements may also be based, at least in part, on a particular type, make, or model of a crowdsourcing mobile device. For example, if data asymmetry or redundancy is detected with respect to a particular type, make, or model of a mobile device (e.g., Samsung Galaxy S® 4, iPhone® 5S, iPad® Air, Microsoft® Surface 2 Tablet, etc.), a crowdsourcing server may provide an appropriate indication (e.g., via a "blacklist," etc.), such as asking devices of that type, make, or model to not send further measurement reports. This may, for example, assist in maintaining a relatively symmetric data distribution across various types, makes, or models of mobile devices, such as by not allowing a crowdsourced database to be dominated by a particular device type, make, or model, which, at times, may also introduce or create systemic or like errors, as was indicated. Thus, selective crowdsourcing of location-related data may provide advantages. For example, crowdsourcing mobile devices may "take" or process Wi-Fi or like wireless scans (e.g., from a nearby Wi-Fi access point, Wi-Fi scanner, etc.) if the mobile devices are within one or more designated areas, which may improve power consumption, free processing resources, address asymmetric or redundant data collection, etc., as was also discussed.

Figure 4:
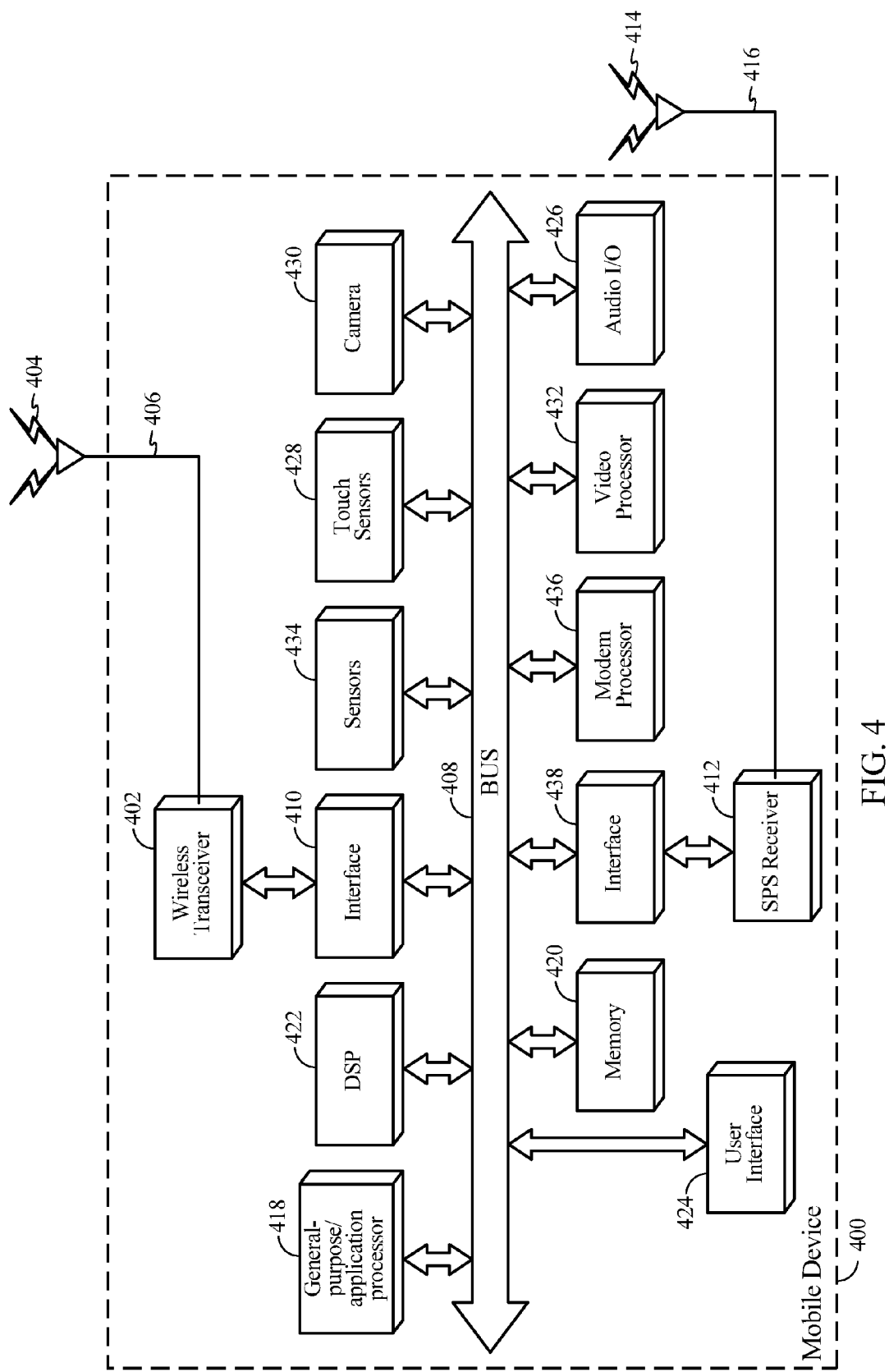
FIG. 4 is a schematic diagram illustrating an implementation of an example computing environment associated with a mobile device.

FIG. 4 is a schematic diagram of an implementation of an example computing environment associated with a mobile device that may be used, at least in part, to facilitate or support one or more operations or techniques for selective crowdsourcing of location-related data. An example computing environment may comprise, for example, a mobile device 400 that may include one or more features or aspects of mobile device 102 of FIG. 1, though claimed subject matter is not so limited. For example, in some instances, mobile device 400 may comprise a wireless transceiver 402 capable of transmitting or receiving wireless signals, referenced generally at 404, such as via an antenna 406 over a suitable wireless communications network. Wireless transceiver 402 may, for example, be capable of sending or receiving one or more suitable communications, such as one or more communications discussed with reference to FIGS. 1-3.

By way of example but not limitation, in some instances, wireless transceiver 402 may comprise, for example, or be representative of means for collecting measurements of transmissions of one or more wireless transmitters while traveling within an area in a venue, such as to implement operation 202 of FIG. 2, at least in part. In addition, in at least one implementation, wireless transceiver 402 may be representative of or comprise, for example, means for inhibiting collection of the measurements in at least one portion of the venue indicated by a crowdsourcing server, such as to implement operation 204 of FIG. 2, at least in part. Also, at times, wireless transceiver 402 may comprise, for example, or be representative of means for communicating one or more messages to the crowdsourcing server comprising the collected measurements for use in computing positioning assistance data based, at least in part, on the one or more wireless transmitters, as illustrated in or described with respect to operation 206 of FIG. 2, for example. Wireless transceiver 402 may, for example, be coupled or connected to a bus 408 via a wireless transceiver bus interface 410. Depending on an implementation, at times, wireless transceiver bus interface 410 may, for example, be at least partially integrated with wireless transceiver 402. Some implementations may include multiple wireless transceivers 402 or antennas 406 so as to enable transmitting or receiving signals according to a corresponding multiple wireless communication standards such as Wireless Fidelity (WiFi), Code Division Multiple Access (CDMA), Wideband-CDMA (W-CDMA), Long Term Evolution (LTE), Bluetooth®, just to name a few examples.

In an implementation, mobile device 400 may, for example, comprise an SPS or like receiver 412 capable of receiving or acquiring one or more SPS or other suitable wireless signals 414, such as via an SPS or like antenna 416. SPS receiver 412 may process, in whole or in part, one or more acquired SPS signals 414 for estimating a location, coarse or otherwise, of mobile device 400. In some instances, one or more general-purpose application processors 418 (henceforth referred to as "processor"), memory 420, digital signal processor(s) (DSP) 422, or like specialized devices or processors not shown may be utilized to process acquired SPS signals 414, in whole or in part, calculate a location of mobile device 400, such as in conjunction with SPS receiver 412, suitable positioning assistance data, or the like. Storage of SPS or other signals for implementing one or more positioning operations, such as in connection with one or more techniques for selective crowdsourcing of location-related data, for example, may be performed, at least in part, in memory 420, suitable registers or buffers (not shown). Although not shown, it should be appreciated that in at least one implementation one or more processors 418, memory 420, DSPs 422, or like specialized devices or processors may comprise one or more processing modules capable of collecting measurements of transmissions of one or more wireless transmitters while traveling within an area in a venue; inhibiting collection of the measurements in at least one portion of the venue indicated by a crowdsourcing server; and communicating one or more messages to the crowdsourcing server comprising the collected measurements for use in computing positioning assistance data based, at least in part, on the one or more wireless transmitters.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 418 or DSP 422 may include one or more processors, controllers, microprocessors, microcontrollers, application specific integrated circuits, digital signal processors, programmable logic devices, field programmable gate arrays, or the like, or any combination thereof. Thus, at times, processor 418 or DSP 322 or any combination thereof may comprise or be representative of means for collecting measurements of transmissions of one or more wireless transmitters while traveling within an area in a venue, such as to implement operation 202 of FIG. 2, at least in part. In addition, in at least one implementation, processor 418 or DSP 322 may be representative of or comprise, for example, means for inhibiting collection of the measurements in at least one portion of the venue indicated by a crowdsourcing server, such as to implement operation 204 of FIG. 2, at least in part. Also, at times, processor 418 or DSP 322 may comprise, for example, or be representative of means for communicating one or more messages to the crowdsourcing server comprising the collected measurements for use in computing positioning assistance data based, at least in part, on the one or more wireless transmitters, as illustrated in or described with respect to operation 206 of FIG. 2, for example.

As illustrated, DSP 422 may be coupled or connected to processor 418 and memory 420 via bus 408. Although not shown, in some instances, bus 408 may comprise one or more bus interfaces that may be integrated with one or more applicable components of mobile device 400, such as DSP 422, processor 418, memory 420, or the like. In various embodiments, one or more operations or functions described herein may be performed in response to execution of one or more machine-readable instructions stored in memory 420, such as on a computer-readable storage medium, such as RAM, ROM, FLASH, disc drive, etc., just to name a few examples. Instructions may, for example, be executable via processor 418, one or more specialized processors not shown, DSP 422, or the like. Memory 420 may comprise a non-transitory processor-readable memory, computer-readable memory, etc. that may store software code (e.g., programming code, instructions, etc.) that may be executable by processor 418, DSP 422, or the like to perform operations or functions described herein.

Mobile device 400 may comprise a user interface 424, which may include any one of several devices such as, for example, a speaker, microphone, display device, vibration device, keyboard, touch screen, etc., just to name a few examples. In at least one implementation, user interface 424 may enable a user to interact with one or more applications hosted on mobile device 400. For example, one or more devices of user interface 424 may store analog or digital signals on memory 420 to be further processed by DSP 422, processor 418, etc. in response to input or action from a user. Similarly, one or more applications hosted on mobile device 400 may store analog or digital signals in memory 420 to present an output signal to a user. In some implementations, mobile device 400 may optionally include a dedicated audio input/output (I/O) device 426 comprising, for example, a dedicated speaker, microphone, digital to analog circuitry, analog to digital circuitry, amplifiers, gain control, or the like. It should be understood, however, that this is merely an example of how audio I/O device 426 may be implemented, and that claimed subject matter is not limited in this respect. As seen, mobile device 400 may comprise one or more touch sensors 428 responsive to touching or like pressure applied on a keyboard, touch screen, or the like.

In an implementation, mobile device 400 may comprise, for example, a camera 440, dedicated or otherwise, such as for capturing still or moving imagery, or the like. Camera 440 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 418, DSP 422, or the like. Optionally or alternatively, a video processor 432, dedicated or otherwise, may perform conditioning, encoding, compression, or manipulation of signals representing one or more captured images. Additionally, video processor 432 may, for example, decode or decompress one or more stored images for presentation on a display (not shown) of mobile device 400.

Mobile device 400 may comprise one or more sensors 434 coupled or connected to bus 408, such as, for example, one or more inertial sensors, ambient environment sensors, or the like. Inertial sensors of sensors 444 may comprise, for example, one or more accelerometers (e.g., collectively responding to acceleration of mobile device 400 in one, two, or three dimensions, etc.), gyroscopes or magnetometers (e.g., to support one or more compass or like applications, etc.), etc., just to illustrate a few examples. Ambient environment sensors of mobile device 400 may comprise, for example, one or more barometric pressure sensors, temperature sensors, ambient light detectors, camera sensors, microphones, etc., just to name few examples. Sensors 434 may generate analog or digital signals that may be stored in memory 420 and may be processed by DSP 422, processor 418, etc., such as in support of one or more applications directed to positioning or navigation operations, wireless communications, radio heatmap learning, video gaming or the like.

In a particular implementation, mobile device 400 may comprise, for example, a modem processor 436, dedicated or otherwise, capable of performing baseband processing of signals received or downconverted via wireless transceiver 402, SPS receiver 412, or the like. Similarly, modem processor 436 may perform baseband processing of signals to be upconverted for transmission via wireless transceiver 402, for example. In alternative implementations, instead of having a dedicated modem processor, baseband processing may be performed, at least in part, by processor 418, DSP 422, or the like. In addition, in some instances, an interface 438, although illustrated as a separate component, may be integrated, in whole or in part, with one or more applicable components of mobile device 400, such as bus 408 or SPS receiver 412, for example. Optionally or alternatively, SPS receiver 412 may be coupled or connected to bus 408 directly. It should be understood, however, that these are merely examples of components or structures that may perform baseband processing, and that claimed subject matter is not limited in this regard.

Figure 5:
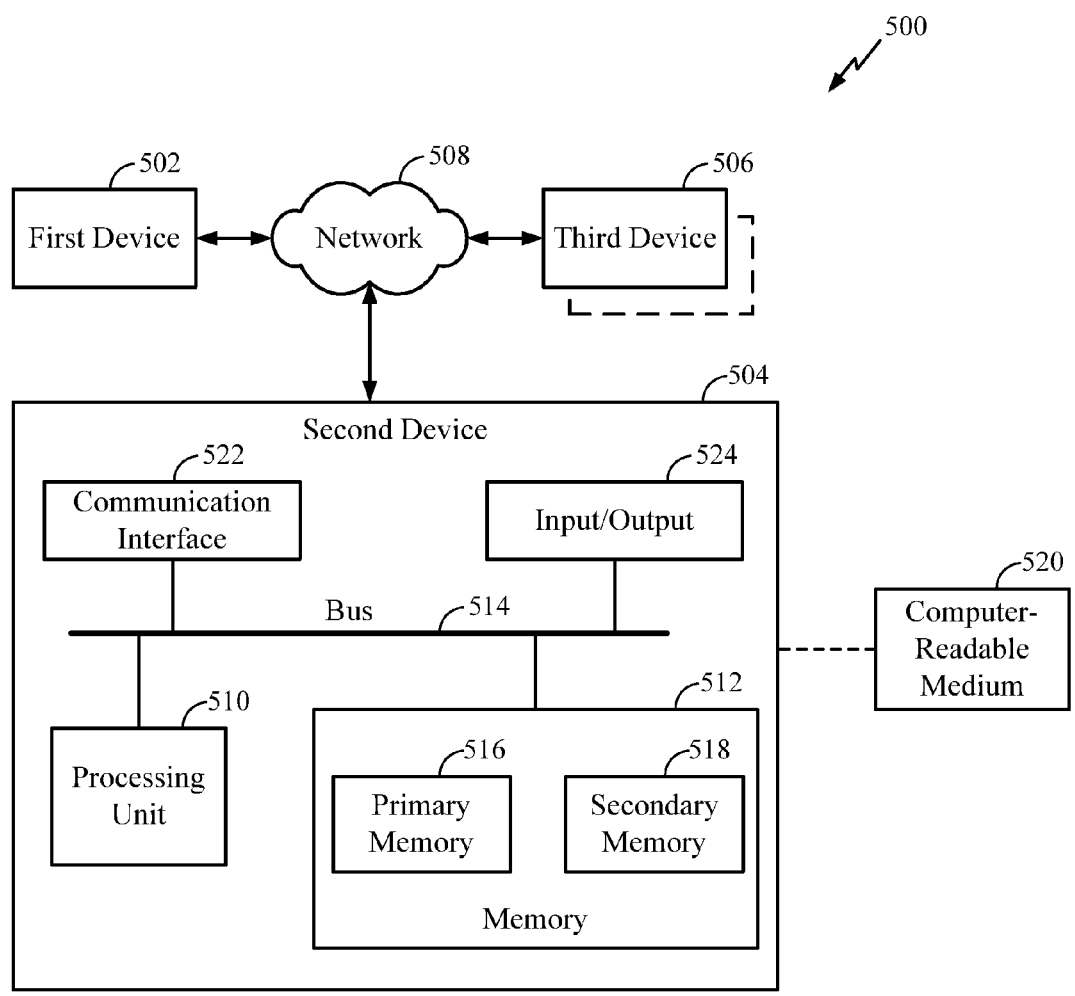
FIG. 5 is a schematic diagram illustrating an implementation of an example computing environment associated with a server.

FIG. 5 is a schematic diagram illustrating an implementation of an example computing environment or system 500 that may be associated with or include one or more servers or other devices capable of partially or substantially implementing or supporting one or more operations or techniques for selective crowdsourcing of location-related data, such as discussed above in connection with FIGS. 1-3, for example. Computing environment 500 may include, for example, a first device 502, a second device 504, a third device 506, etc., which may be operatively coupled together via a communications network 508. In some instances, first device 502 may comprise a server capable of providing positioning assistance data, such as, for example, identities or locations of known wireless transmitters, radio heatmap, base station almanac, electronic digital map, database of wireless transmitters, or the like. For example, first device 502 may also comprise a server capable of providing an electronic digital map to a mobile device based, at least in part, on a coarse or rough estimate of a location of the mobile device, upon request, or the like, as was indicated. First device 502 may also comprise a server capable of providing any other suitable indoor positioning assistance data (e.g., an electronic digital map, radio heatmap, etc.), relevant to a location of a mobile device. Second device 504 or third device 506 may comprise, for example, mobile devices, though claimed subject matter is not so limited. For example, in some instances, second device 504 may comprise a server functionally or structurally similar to first device 502, just to illustrate another possible implementation. In addition, communications network 508 may comprise, for example, one or more wireless transmitters, such as access points, femtocells, or the like. Of course, claimed subject matter is not limited in scope in these respects.

First device 502, second device 504, or third device 506 may be representative of any device, appliance, platform, or machine that may be capable of exchanging information over communications network 508. By way of example but not limitation, any of first device 502, second device 504, or third device 506 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 502, 504, and 506, respectively, may comprise one or more of a mobile device, wireless transmitter or receiver, server, etc. in accordance with example implementations described herein.

In an implementation, communications network 508 may be representative of one or more communication links, processes, or resources capable of supporting an exchange of information between at least two of first device 502, second device 504, or third device 506. By way of example but not limitation, communications network 508 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 506, there may be additional like devices operatively coupled to communications network 508. It is also recognized that all or part of various devices or networks shown in computing environment 500, or processes or methods, as described herein, may be implemented using or otherwise including hardware, firmware, software, or any combination thereof.

By way of example but not limitation, second device 504 may include at least one processing unit 510 that may be operatively coupled to a memory 512 via a bus 514. Processing unit 510 may be representative of one or more circuits capable of performing at least a portion of a suitable computing procedure or process. For example, processing unit 510 may include one or more processors, controllers, microprocessors, microcontrollers, application specific integrated circuits, digital signal processors, programmable logic devices, field programmable gate arrays, or the like, or any combination thereof. Although not shown, second device 504 may include a location-tracking unit that may initiate a position fix, coarse or otherwise, of a suitable mobile device, such as in an indoor or like area of interest, for example, based, at least in part, on one or more received or acquired wireless signals, such as from an SPS, one or more Wi-Fi access points, etc. In some implementations, a location-tracking unit may be at least partially integrated with a suitable processing unit, such as processing unit 510, for example, though claimed subject matter is not so limited. In certain server-based or server-supported implementations, processing unit 510 may, for example, comprise means for collecting measurements of transmissions of one or more wireless transmitters while traveling within an area in a venue, such as to facilitate or support operation 202 of FIG. 2, at least in part. In some instances, processing unit 510 may, for example, comprise means for inhibiting collection of the measurements in at least one portion of the venue indicated by a crowdsourcing server, such as to facilitate or support operation 204 of FIG. 2, for example. Depending on an implementation, processing unit 510 may also comprise, for example, means for communicating one or more messages to the crowdsourcing server comprising the collected measurements for use in computing positioning assistance data based, at least in part, on the one or more wireless transmitters, such as to facilitate or support operation 206 of FIG. 2, at least in part.

Memory 512 may be representative of any information storage mechanism or appliance. Memory 512 may include, for example, a primary memory 516 and a secondary memory 518. Primary memory 516 may include, for example, a random access memory, read only memory, etc. While illustrated in this example as being separate from processing unit 510, it should be understood that all or part of primary memory 516 may be provided within or otherwise co-located/coupled with processing unit 510. Secondary memory 518 may include, for example, same or similar type of memory as primary memory or one or more information storage devices or systems, such as, for example, a disk drive, an optical disc drive, a tape drive, a solid state memory drive, etc. In certain implementations, secondary memory 518 may be operatively receptive of, or otherwise configurable to couple to, a computer-readable medium 520. Computer-readable medium 520 may include, for example, any non-transitory storage medium that may carry or make accessible information, code, or instructions for one or more of devices in computing environment 500. Computer-readable medium 520 may also be referred to as a storage medium.

Second device 504 may include, for example, a communication interface 522 that may provide for or otherwise support an operative coupling of second device 504 to at least communications network 508. By way of example but not limitation, communication interface 522 may include a network interface device or card, a modem, a router, a switch, a transceiver, and the like. Second device 504 may also include, for example, an input/output device 524. Input/output device 524 may be representative of one or more devices or features that may be configurable to accept or otherwise introduce human or machine inputs, or one or more devices or features that may be capable of delivering or otherwise providing for human or machine outputs. By way of example but not limitation, input/output device 524 may include an operatively configured display, speaker, keyboard, mouse, trackball, touch screen, information port, or the like.

Methodologies described herein may be implemented by various means depending upon applications according to particular features or examples. For example, methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, methodologies may be implemented with modules (e.g., procedures, functions, etc.) having instructions that perform functions described herein. Any computer-readable medium tangibly embodying instructions may be used in implementing methodologies described herein. For example, software codes may be stored in a memory and executed by a processor. Memory may be implemented within the processor or external to the processor. As used herein the term "memory" may refer to any type of long term, short term, volatile, non-volatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2"(3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, obtaining positioning assistance data, extending cellular telephone service into a business or home, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example, and may provide a mobile device access to a larger cellular telecommunication network by way of another broadband network, such as the Internet. However, such details relating to femtocells are merely examples, and claimed subject matter is not so limited.

Techniques described herein may be used with an SPS that includes any one of several GNSS or combinations of GNSS. Furthermore, techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal, etc.). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "space vehicle" (SV), as used herein, is intended to include terrestrial transmitters acting as pseudolites, equivalents of pseudolites, and possibly others. The terms "SPS signals" or "SV signals", as used herein, is intended to include SPS-like signals from terrestrial transmitters, including terrestrial transmitters acting as pseudolites or equivalents of pseudolites.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method of crowdsourcing at a mobile device, comprising:
   receiving, prior to collecting measurements of transmissions of one or more wireless transmitters, a published list of a plurality of designated areas where measurement reports are not desired;
   collecting, at said mobile device, said measurements of transmissions of said one or more wireless transmitters while traveling within a first area in a venue, wherein said first area is not contained within said published list;
   determining, at said mobile device, that said mobile device is located within a second area in said venue, and said second area is contained in said plurality of designated areas;
   inhibiting collection of measurements within said second area; and
   communicating one or more messages to said crowdsourcing server comprising said collected measurements from said first area for use in computing positioning assistance data based, at least in part, on said one or more wireless transmitters.

2. The method of claim 1, wherein said one or more messages comprise said collected measurements paired with estimated "ground truth" locations in said venue.

3. The method of claim 1, and further comprising determining whether said mobile device is located within said at least one portion based, at least in part, on a comparison of an estimated location of said mobile device with a geofence.

4. The method of claim 1, wherein said inhibiting collection of said measurements further comprises inhibiting collection in one or more areas identified in a "blacklist" published by said crowdsourcing server.

5. The method of claim 1, wherein said inhibiting collection of said measurements further comprises decreasing a transmission rate of said one or more messages communicated from said at least one portion of said venue.

6. The method of claim 1, wherein said measurements comprise: an RSSI-related measurement, or an RTT-related measurement; or any combination thereof.

7. The method of claim 1, wherein said one or more wireless transmitters comprise one or more IEEE 802.11 Wi-Fi access points.

8. The method of claim 1, wherein said collecting said measurements is based, at least in part, on a "whitelist" published by said crowdsourcing server.

9. The method of claim 1, wherein said one or more messages comprise one or more geo-tagged messages.

10. The method of claim 1, wherein said communicating said one or more messages is based, at least in part, on detected signal strengths of said one or more wireless transmitters.

11. The method of claim 1, wherein said communicating said one or more messages to said crowdsourcing server is based, at least in part, on a "whitelist" published by said crowdsourcing server; a "blacklist" published by said crowdsourcing server, or a geofence; or any combination thereof.

12. A mobile device for crowdsourcing, comprising: a wireless transceiver to:
communicate, through said wireless transceiver, with a crowdsourcing server via an electronic communications network;
receive, prior to a collection of measurements of transmissions of one or more wireless transmitters, a published list of a plurality of designated areas where measurement reports are not desired;
collect said measurements of transmissions of said one or more wireless transmitters while traveling within a first area in a venue, wherein said first area is not contained within said published list;
determine, at said mobile device, that said mobile device is located within a second area in said venue, and said second area is contained in said plurality of designated areas; and
communicate, through said wireless transceiver, one or more messages to said crowdsourcing server comprising said collected measurements from said first area for use in computing positioning assistance data based, at least in part, on said one or more wireless transmitters; and
one or more processors configured to:
inhibit collection of measurements within said second area.

13. The mobile device of claim 12, wherein said one or more messages comprise said collected measurements paired with estimated "ground truth" locations in said venue.

14. The mobile device of claim 12, wherein said one or more processors are further configured to determine whether said mobile device is located within said at least one portion based, at least in part, on a comparison of an estimated location of said mobile device with a geofence.

15. The mobile device of claim 12, wherein said one or more processors configured to inhibit collection of said measurements are further configured to inhibit collection in one or more areas identified in a "blacklist" published by said crowdsourcing server.

16. The mobile device of claim 12, wherein said one or more processors configured to inhibit collection of said measurements are further configured to decrease a transmission rate of said one or more messages communicated from said at least one portion of said venue.

17. The mobile device of claim 12, wherein said one or more processors configured to collect said measurements are further configured to collect said measurements based, at least in part, on a "whitelist" published by said crowdsourcing server.

18. The mobile device of claim 12, wherein said one or more messages comprise one or more geo-tagged messages.

19. The mobile device of claim 12, wherein said one or more processors configured to communicate said one or more messages are further configured to communicate said one or more messages based, at least in part, on detected signal strengths of said one or more wireless transmitters.

20. The mobile device of claim 12, wherein said one or more processors configured to communicate said one or more messages are further configured to communicate said one or more messages based, at least in part, on: a "whitelist" published by said crowdsourcing server; a "blacklist" published by said crowdsourcing server, or a geofence; or any combination thereof.

21. A mobile device comprising:
means for receiving, prior to collecting measurements of transmissions of one or more wireless transmitters, a published list of a plurality of designated areas where measurement reports are not desired;
means for collecting, at said mobile device, said measurements of transmissions of said one or more wireless transmitters while traveling within a first area in a venue, wherein said first area is not contained within said published list;
means for determining, at said mobile device, that said mobile device is located within a second area in said venue, and said second area is contained in said plurality of designated areas;
means for inhibiting collection of measurements within said second area; and
means for communicating one or more messages to said crowdsourcing server comprising said collected measurements from said first area for use in computing positioning assistance data based, at least in part, on said one or more wireless transmitters.

22. The mobile device of claim 21, wherein said means for inhibiting collection of said measurements further comprise means for inhibiting collection in one or more areas identified in a "blacklist" published by said crowdsourcing server.

23. The mobile device of claim 21, wherein said means for inhibiting collection of said measurements further comprise means for decreasing a transmission rate of said one or more messages communicated from said at least one portion of said venue.

24. The mobile device of claim 21, wherein said means for collecting said measurements further comprise means for collecting said measurements based, at least in part, on a "whitelist" published by said crowdsourcing server.

25. The mobile device of claim 21, wherein said means for communicating said one or more messages further comprise means for communicating said one or more messages based, at least in part, on detected signal strengths of said one or more wireless transmitters.

26. The mobile device of claim 21, wherein said means for communicating said one or more messages to said crowdsourcing server further comprise means for communicating said one or more messages based, at least in part, on at least one of the following: a "whitelist" published by said crowdsourcing server; a "blacklist" published by said crowdsourcing server, or a geofence; or any combination thereof.

27. A non-transitory storage medium having code executable by a processor thereon, comprising:

code to receive, prior to a collection of measurements of transmissions of one or more wireless transmitters, a published list of a plurality of designated areas where measurement reports are not desired;

code to collect, at said mobile device, said measurements of transmissions of said one or more wireless transmitters while traveling within a first area in a venue, wherein said first area is not contained within said published list;

code to determine, at said mobile device, that said mobile device is located within a second area in said venue, and said second area is contained in said plurality of designated areas;

code to inhibit collection of measurements within said second area; and code to communicate one or more messages to said crowdsourcing server comprising said collected measurements from said first area for use in computing positioning assistance data based, at least in part, on said one or more wireless transmitters.

28. The non-transitory storage medium of claim 27, wherein said code to inhibit collection of said measurements further comprises code to inhibit collection in one or more areas identified in a "blacklist" published by said crowdsourcing server.

29. The non-transitory storage medium of claim 27, wherein said code to inhibit collection of said measurements further comprises code to decrease a transmission rate of said one or more messages communicated from said at least one portion of said venue.

* * * * *